(12) United States Patent
Kuehner et al.

(10) Patent No.: US 11,920,992 B2
(45) Date of Patent: Mar. 5, 2024

(54) DEFORMABLE SENSORS AND METHODS USING MAGNETIC REPULSION FOR MODIFYING RUN-TIME MEMBRANE STIFFNESS

(71) Applicant: Toyota Research Institute, Inc., Los Altos, CA (US)

(72) Inventors: Manuel L. Kuehner, Mountain View, CA (US); Naveen Suresh Kuppuswamy, Arlington, MA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 213 days.

(21) Appl. No.: 17/380,237

(22) Filed: Jul. 20, 2021

(65) Prior Publication Data
US 2023/0021848 A1 Jan. 26, 2023

(51) Int. Cl.
*G01L 1/12* (2006.01)
*B25J 13/08* (2006.01)
*G01L 5/00* (2006.01)

(52) U.S. Cl.
CPC ............... *G01L 1/12* (2013.01); *B25J 13/082* (2013.01); *B25J 13/084* (2013.01); *G01L 5/0061* (2013.01)

(58) Field of Classification Search
CPC ........ G01L 1/12; G01L 5/0061; B25J 13/082; B25J 13/084
See application file for complete search history.

(56) References Cited

U.S. PATENT DOCUMENTS

| | | | | |
|---|---|---|---|---|
| 7,733,550 | B2* | 6/2010 | Charton | G02B 26/0825 |
| | | | | 359/224.1 |
| 9,651,423 | B1* | 5/2017 | Zhang | G01D 5/16 |
| 10,286,560 | B1* | 5/2019 | Hwang | B25J 15/12 |
| 2005/0174109 | A1* | 8/2005 | Pullini | B60C 23/0425 |
| | | | | 324/207.23 |
| 2019/0091871 | A1* | 3/2019 | Alspach | B25J 13/084 |

(Continued)

FOREIGN PATENT DOCUMENTS

| CN | 104074920 B | 3/2016 |
|---|---|---|
| CN | 209625466 U | 11/2019 |
| CN | 111267128 B | 11/2020 |

(Continued)

OTHER PUBLICATIONS

Alspach, A., et al., "Soft-bubble: A highly compliant dense geometry tactile sensor for robot manipulation", https://arxiv.org/abs/1904.02252, 2019.

(Continued)

*Primary Examiner* — Jamel E Williams
(74) *Attorney, Agent, or Firm* — DINSMORE & SHOHL LLP

(57) ABSTRACT

Deformable sensors and methods for magnetically modifying membrane stiffness are provided. A deformable sensor may include a membrane coupled to a housing to form a sensor cavity. The deformable sensor may further include a first magnet located on an inner surface of the membrane in the sensor cavity. The deformable sensor may additionally include a magnetic object located at a base within the sensor cavity. The magnetic object may be configured to modifiably repel the first magnet and modify stiffness of the deformable sensor based upon the modified repulsion.

14 Claims, 10 Drawing Sheets

(56) References Cited

U.S. PATENT DOCUMENTS

2019/0091872 A1* 3/2019 Alspach ................ B25J 13/084
2021/0302249 A1* 9/2021 Alspach ............... G01B 21/042

FOREIGN PATENT DOCUMENTS

CN              111331620 B     1/2021
WO     WO-2011029575 A1 *  3/2011    ............. G01D 5/145

OTHER PUBLICATIONS

Kuppuswamy, N., et al., "Soft-Bubble grippers for robust and perceptive manipulation", https://arxiv.org/abs/2004.03691, 2020.

Kuppuswamy, N., et al., "Fast Model-Based Contact Patch and Pose Estimation for Highly Deformable Dense-Geometry Tactile Sensors", IEEE Robotics and Automation Letters 5, No. 2 (4), 10.1109/LRA.2019.2961050, 2020.

Toyota Research Institute (TRI), "Sensing is Believing: More Capable Robot Hands with the Soft Bubble Gripper", https://www.tri.global/news/sensing-is-believing-more-sensitive-robot-hands-t-2020-9-9/, 2020.

* cited by examiner

DEFORMABLE SENSORS AND METHODS USING MAGNETIC REPULSION FOR MODIFYING RUN-TIME MEMBRANE STIFFNESS

TECHNICAL FIELD

Embodiments described herein generally relate to contact sensors and, more particularly, to deformable contact and geometry/pose sensors capable of detecting contact and a geometry of an object. Embodiments also relate to robots incorporating deformable contact and geometry sensors. Deformability may refer, for example, stiffness and/or the ease of deformation of deformable sensors. A deformable sensor may have a fixed or variable stiffness. The amount of stiffness of a deformable sensor can impact its suitability for manipulating objects of varying fragility.

BACKGROUND

Contact sensors are used to determine whether or not one object is in physical contact with another object. For example, robots often use contact sensors to determine whether a portion of the robot is in contact with an object. Control of the robot may then be based at least in part on signals from one or more contact sensors. As robots navigate environments, the ability to modify aspects their interaction with their environment at "run-time" can provide a significant technical advantage from such rapid adaptation.

SUMMARY

In one embodiment, a deformable sensor may include a membrane coupled to a housing to form a sensor cavity. The deformable sensor may further include a first magnet located on an inner surface of the membrane in the sensor cavity. The deformable sensor may also include a magnetic object located at a base within the sensor cavity. The magnetic object may be configured to modifiably repel the first magnet and modify stiffness of the deformable sensor.

In another embodiment, a method of magnetically modifying stiffness of a deformable sensor may include modifying repulsion within a sensor cavity formed by a membrane coupled to a housing, between a first magnet located on an inner surface of the membrane in the sensor cavity and a magnetic object located at a base within the sensor cavity. The method may further include modifying stiffness of the deformable sensor based upon the modified repulsion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As humans, our sense of touch allows us to determine the shape of an object without looking at the object. Further, our sense of touch provides information as to how to properly grasp and hold an object. Our fingers are more sensitive to touch than other parts of the body, such as arms. This is because we manipulate objects with our hands.

Robots are commonly equipped with end effectors that are configured to perform certain tasks. For example, an end effector of a robotic arm may be configured as a human hand, or as a two-fingered gripper. However, robots do not have varying levels of touch sensitivity as do humans. End effectors may include sensors such as pressure sensors, but such sensors provide limited information about the object that is in contact with the end effector. Thus, the robot may damage a target object by using too much force, or drop the object because it does not properly grasp the object.

Further, in some applications, a deformable/compliant end effector may be desirable. For example, a deformable end effector may be desirable in robot-human interactions. Further, a deformable/compliant end effector may be desirable when the robot manipulates fragile objects. Further still, based upon objects encountered and changing conditions within an environment, it may be desirable to have deformable sensors that can have real-time modification of their stiffness (or force-displacement, used interchangeably herein).

Embodiments of the present disclosure are directed to deformable/compliant contact and/or geometry/bubble sensors (hereinafter "deformable sensors") that not only detect contact with a target object, but also detect the geometry, pose and contact force of the target object. Particularly, the deformable sensors described herein are capable of modifying their stiffness based upon different factors contributing to such stiffness. While deformable sensor stiffness can remain consistent/fixed, a deformable sensor with variable stiffness can allow the deformable sensor to be adaptable in real-time. For example, where objects of varying levels of rigidity or fragility are encountered, adaptable levels of deformable sensor stiffness can provide a real-world, technological benefit. Thus, the deformable sensors described herein provide a robot (or other device) with real-time stiffness modification when manipulating objects (i.e., to modify a stiffness of the soft bubble to change the amount of force required to deform the sensor at runtime).

Figure 1A:
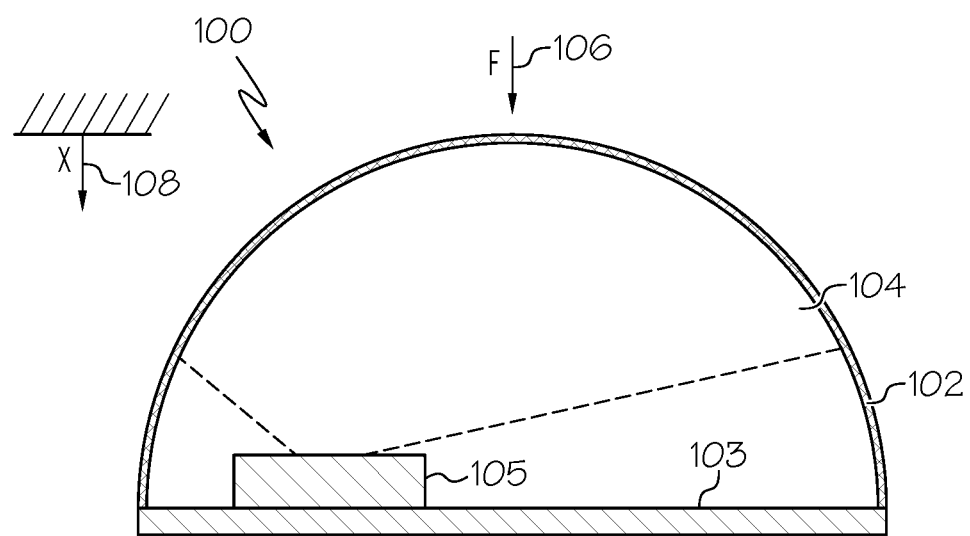
FIG. 1A schematically depicts a side view of an exemplary deformable sensor according to one or more embodiments described and illustrated herein.

Referring now to FIG. 1A, an example deformable sensor 100 is schematically illustrated in a side view. The example deformable sensor 100 generally comprises a housing 103 and a deformable membrane 102 coupled to the housing 103 to define a sensor cavity 104 filled with a medium, such as air, which may affect the stiffness of the deformable sensor 100. Thus, air in the sensor cavity 104 provides pressure such that the deformable membrane 102 forms a dome shape as shown in FIG. 1, although any suitable shape may be utilized in other embodiments. In another example, the medium is a gel, such as silicone or other rubber-like substance. In some embodiments, a substance such as solid silicone may be cast in a given shape before assembly of the deformable sensor 100. In various embodiments, the medium may be anything that is transparent to one or more floor sensors 105, such as to a wavelength utilized by a time of flight sensor or visible light used by a camera. The medium may include clear/transparent rubbers in some embodiments. In other embodiments, the medium may be a liquid. In some examples, the deformable membrane 102 and the medium within the sensor cavity 104 may be fabricated of the same material, such as, without limitation, silicone. In some embodiments, the deformable sensor 100 may be mountable. For example, the housing 103 may include brackets or other suitable fasteners or adhesives to be mounted any suitable object (such as a robot) or material. The deformable membrane 102 may be a latex or any other suitable material, such as a suitably thin, non-porous, rubber-like material. In addition to air inside the sensor cavity 104, the stiffness or deformability of the deformable sensor 100 may be affected by the material of the deformable membrane 102, as discussed in more detail herein. By using a softer material (e.g., soft silicone), the deformable sensor 100 may be more easily deformed. Similarly, lowering the air pressure within the sensor cavity 104 may also cause the deformable membrane 102 to more easily deform, which may in turn provide for a more deformable sensor 100.

The floor sensor 105 may be capable of sensing depth may be disposed within the sensor cavity 104, which may be measured by the depth resolution of the floor sensor 105. The floor sensor 105 may have a field of view directed through the air (or other medium) and toward a bottom surface of the deformable membrane 102, as depicted in FIG. 1A. In some embodiments, the floor sensor 105 may be an optical sensor. The floor sensor 105 may be capable of detecting deflections of the deformable membrane 102 when the deformable membrane 102 comes into contact with an object. In one example, the floor sensor 105 contains a time-of-flight sensor capable of measuring depth. The time-of-flight sensor emits an optical signal (e.g., an infrared signal) and has individual detectors (i.e., "pixels") that detect how long it takes for the reflected signal to return to the sensor. The time-of-flight sensor may have any desired spatial resolution. The greater the number of pixels, the greater the spatial resolution. The spatial resolution of the sensor disposed within the time-of-flight may be changed. In some cases, low spatial resolution (e.g., one "pixel" that detects a single point's displacement) may be desired. In others, a sensitive time-of-flight sensor may be used within a floor sensor 105 that provides dense tactile sensing. Thus, the floor sensor 105 may be modular because the sensors may be changed depending on the application. A non-limiting example of a time-of-flight sensor is the Pico Flexx sold by PMD Technologies AG of Siegen, Germany. Other types of visual internal sensors that may be utilized within the floor sensor 105 include, by way of non-limiting example, stereo cameras, laser range sensors, structured light sensors/3d scanners, single cameras (such as with dots or other patterns inside), or any other suitable type of visual detector. For example, the floor sensor 105 may be configured as a stereo-camera capable of detecting deflections of the deformable membrane 102 by an object.

Although located atop the housing 103 in this embodiment, a floor sensor 105 may be located in any suitable location within or outside of a deformable sensor 100. Any suitable quantity and/or type of floor sensors 105 may be utilized within a single deformable sensor 100 in some embodiments. A floor sensor 105 may contain any suitable quantity of sensors of any suitable type of sensor (motion sensor, visual sensor, and the like), such that multiple types of sensors may be contained with a floor sensor 105. In some examples, not all floor sensors 105 within a deformable sensor 100 need be of the same type. In some embodiments, the floor sensor 105 may include one or more internal pressure sensors (barometers, pressure sensors, etc., or any combination thereof) utilized to detect the general deformation of the deformable membrane 102 through the medium, which may be used to measure stiffness of the deformable sensor 100 due to air, which may be modified by one or more valves, or any other suitable mechanism for adding and/or removing air or other fluid from the sensor cavity 104.

Figure 1B:
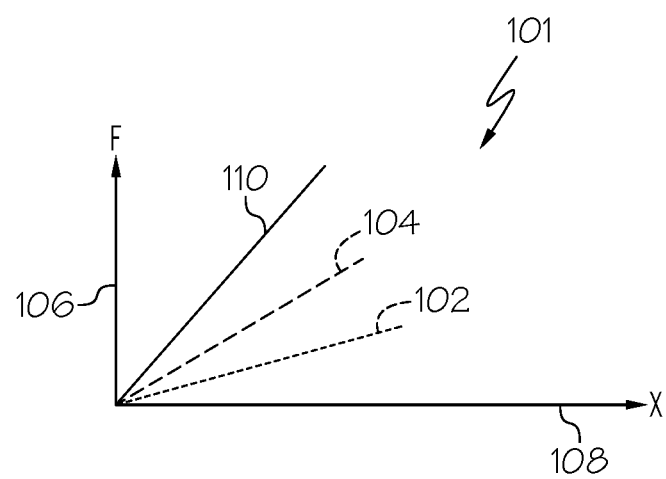
FIG. 1B schematically depicts a graph of fixed force-displacement values for the exemplary deformable sensor depicted by FIG. 1A according to one or more embodiments described and illustrated herein.

Referring now to FIG. 1B, a force-displacement graph 101 plots the force-displacement of the deformable membrane 102, force-displacement due to the air within the sensor cavity 104, and the total force-displacement 110 of the deformable sensor (based on summing these values in terms of force 106 measured over the amount of displacement 108). As shown by the linear relationships in the force-displacement graph 101, the deformable membrane 102 has the lowest amount of stiffness, the sensor cavity 104 has more stiffness, and the total stiffness is the largest, being based on both the deformable membrane and sensor cavity stiffness values. Although depicted in this graph as linear, the force-displacement of the deformable membrane 102, the force-displacement due to the air within the sensor cavity 104, and/or the total force-displacement 110 may be non-linear based on factors such as the shape and size of an object that applies the force on the membrane.

Figure 1C:
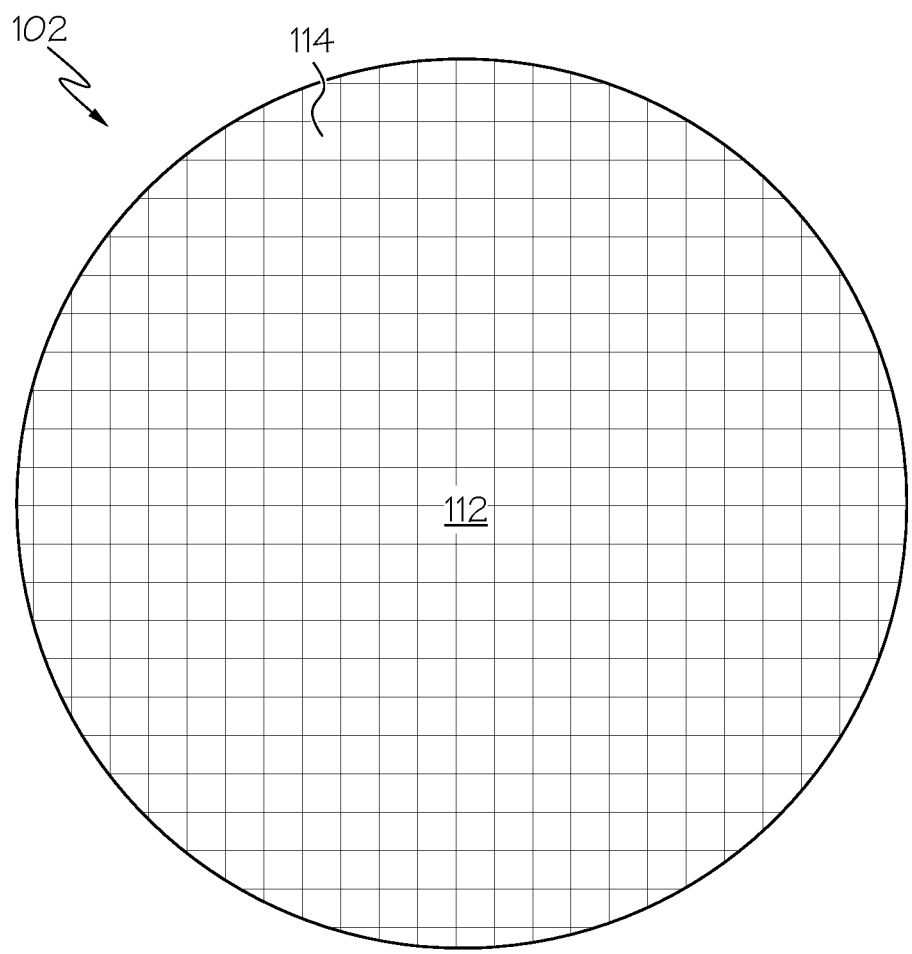
FIG. 1C schematically depicts a pattern on a bottom surface of a deformable membrane of the example deformable sensor depicted by FIG. 1A according to one or more embodiments described and illustrated herein.

Referring now to FIG. 1C, a grid pattern 114 may be applied to a bottom surface 112 of the deformable membrane 102 to assist in the detection of the deformation of the deformable membrane 102. For example, the grid pattern 114 may assist in the detection of the deformation when the floor sensor is a stereo-camera. Varying degrees of distortion to the grid pattern 114 may be utilized to discern how much deformation has occurred. In this example, the distance between parallel lines and/or measuring curvature of lines in the grid pattern 114 may be used to determine the amount of deformation at each point in the grid. It should be understood that embodiments are not limited to grid patterns, as other types of patterns are possible, such as dots, shapes, and the like. The pattern on the bottom surface 112 may be random, and not necessarily arranged in a grid pattern 114 or an array as shown in FIG. 1C.

Figure 2A:
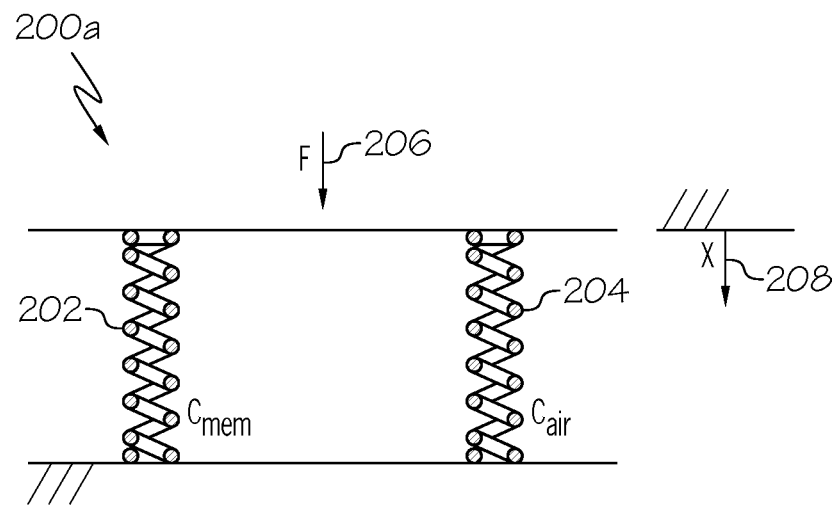
FIG. 2A schematically depicts a force-displacement spring representation of fixed force-displacement of the exemplary deformable sensor depicted by FIG. 1A according to one or more embodiments described and illustrated herein.

Referring now to FIG. 2A, a fixed force-displacement representation 200a depicts consistent stiffness of the deformable sensor as it is subject to an amount of force 206 with respect to a distance/amount of displacement 208 that does not change over time (i.e., potentially linear). The arrows represent the respective directions of the force 206 and displacement 208. In this embodiment, $C_{mem}$ represents fixed membrane force-displacement 202 in the form of a conceptual "spring" symbolizing stiffness of the deformable membrane, and corresponding to the linear air stiffness depicted in 102 FIG. 1B. $C_{air}$ represents fixed air force-displacement 204, corresponding to the linear air stiffness depicted in 104 FIG. 1B. Thus, the amount of resistance or stiffness of the combined deformable membrane force-displacement 202 and fixed air force-displacement 204 remains consistent over time in this example, which is with respect to one specific geometrical position on the membrane surface. This example is a simplification in some embodiments, such that the force-displacement curve here depicts a linear relationship between displacement and force, but this relationship can look different (i.e., non-linear) depending on the shape and the size of the object that applies the force on the membrane.

Figure 2B:
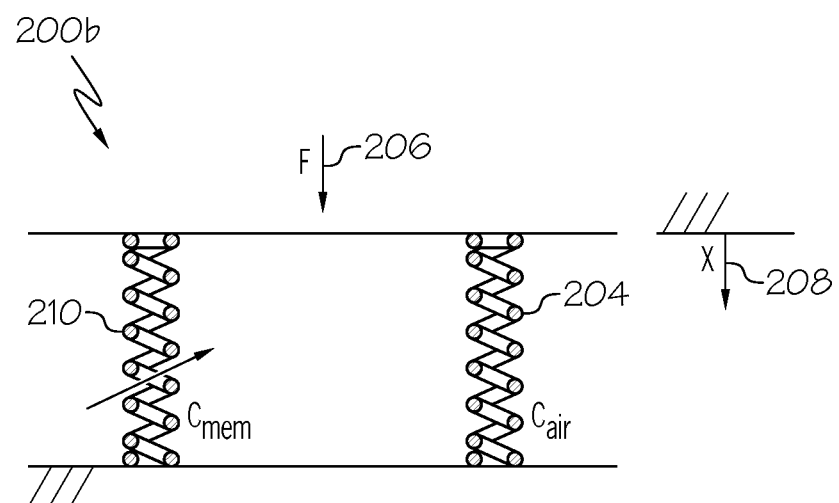
FIG. 2B schematically depicts a spring representation with variable membrane force-displacement with respect to an exemplary deformable sensor according to one or more embodiments described and illustrated herein.

Referring now to FIG. 2B, a variable membrane force-displacement representation 200b depicts the deformable sensor exhibiting variable membrane force-displacement 210, as indicated by the arrow traversing the conceptual spring $C_{mem}$. Here, the amount of force required to create or affect displacement may vary based upon exemplary factors such as changes to how the membrane is secured to the housing, changes to the location on the membrane that force is being applied, and the like. Thus, because the $C_{mem}$ membrane force-displacement 210 is variable, the overall force-displacement of the deformable sensor is also variable, despite the fixed force-displacement $C_{air}$ of the air in the sensor cavity. However, such force-displacement variability may not be available at run-time in some embodiments.

Figure 3:
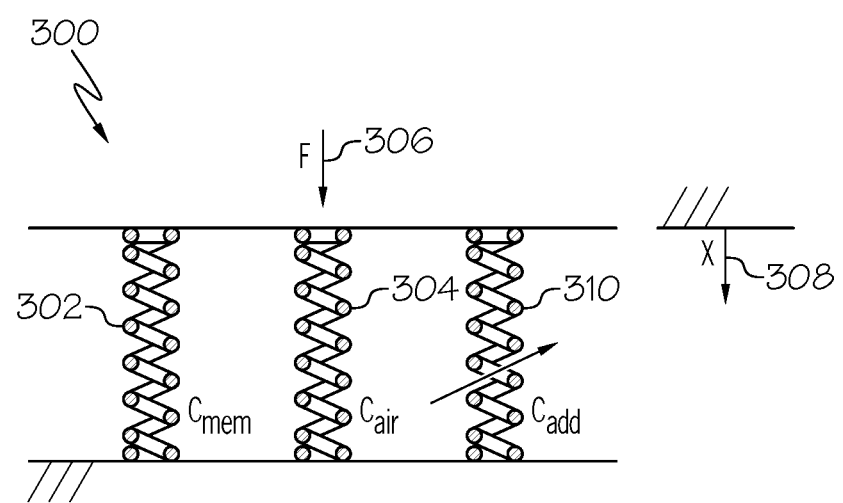
FIG. 3 schematically depicts a spring representation with additional variable force-displacement with respect to an exemplary deformable sensor according to one or more embodiments described and illustrated herein.

Referring now to FIG. 3, an additional variable membrane force-displacement representation 300 depicts a deformable sensor exhibiting a fixed membrane force-displacement 302 represented as a conceptual spring $C_{mem}$. This conceptual spring $C_{mem}$ provides resistance/stiffness with regards to force 306 exerted upon the deformable membrane and the resulting displacement 308. Similarly, another conceptual spring $C_{air}$ represents fixed air force-displacement 304. However, an additional variable force-displacement source 310 is depicted as a third conceptual spring $C_{add}$. The variable force-displacement source 310 provides that the overall force-displacement of the deformable sensor is also variable, despite the fixed force-displacement attributed to both the air in the sensor cavity $C_{air}$ and the membrane $C_{mem}$. As discussed further herein, $C_{add}$ may provide real-time force-displacement variability, which in turn provides the deformable sensor with real-time force-displacement variability.

Figure 4A:
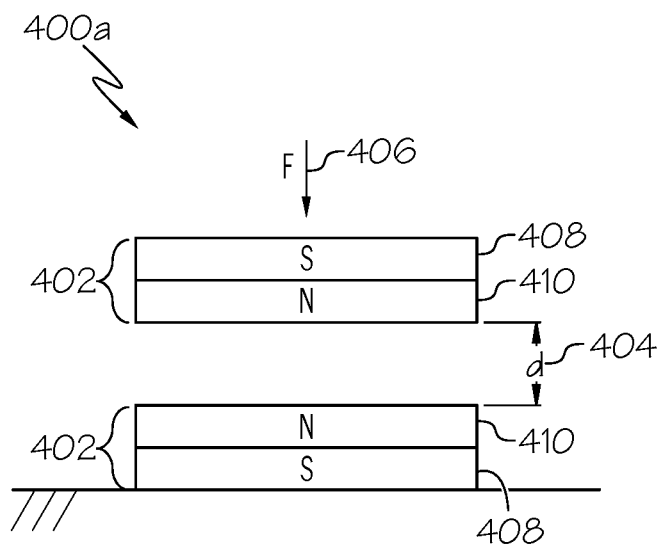
FIG. 4A schematically depicts a magnetic repulsion force-distance diagram according to one or more embodiments described and illustrated herein.

FIG. 4A depicts a magnetic repulsion force-distance diagram 400a. Magnets 402, each having a south polarity 408 and a north polarity 410, are depicted with a distance 404 therebetween. When the magnets 402 are near each other, opposite polarities (e.g., north polarity 410 and south polarity 408) attract each other while equivalent polarities (e.g., north polarity 410 and north polarity 410, or south polarity 408 and south polarity 408) repel each other. A force 406 is applied to the top magnet 402, which may tend to push the top magnet 402 closer to the bottom magnet 402 beneath it. However, the respective north polarities 410 of the magnets 402 face each other, creating a magnetic repulsion. Thus, the magnetic repulsion between the north polarities 410 may act to resist the force 406 being applied to the top magnet 402. As explained in more detail herein, the resistance provided by the magnetic repulsion may increase as the distance 404 between the magnets 402 decreases, such that increased force 406 may be needed to overcome the increased resistance (or stiffness in the context of a deformable sensor).

Figure 4B:
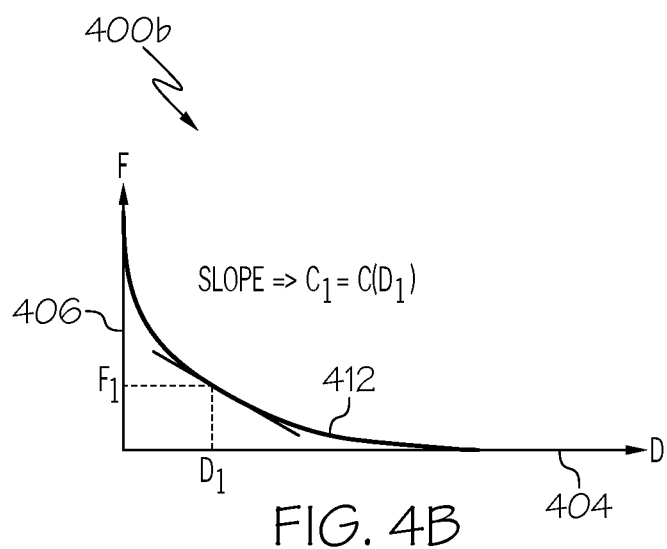
FIG. 4B schematically depicts a magnetic repulsion force-distance graph according to one or more embodiments described and illustrated herein.

FIG. 4B depicts a magnetic repulsion force-distance graph 400b corresponding to the magnetic repulsion force-distance diagram 400a depicted in FIG. 4A. A force-distance slope 412 corresponds to the amount of force 406 being applied to obtain or maintain a distance 404 between the magnets 402. The slope at $D_1$ (i.e., a particular distance 404) with a corresponding $F_1$ (i.e., a particular amount of corresponding force 406) is denoted as $C_1$ (or equivalently as $C(d_1)$), which may correspond to variable force displacement at a particular point (denoted by subscript 1), illustratively at the conceptual spring $C_{add}$ as discussed above with respect to FIG. 3. As seen in the force-distance slope 412, the amount of corresponding force 406 to obtain a particular distance 404 between magnets 402 decreases non-linearly with distance 404, and conversely increases non-linearly as the distance 404 between magnets 402 decreases.

Figure 5A:
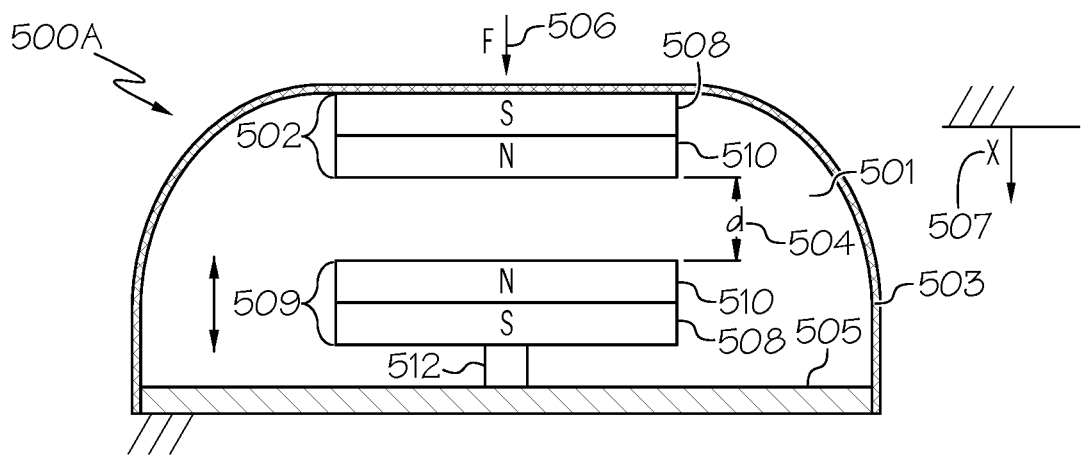
FIG. 5A schematically depicts a deformable sensor with force displacement due to magnetic repulsion between a first magnet and a second magnet that can be raised/lowered according to one or more embodiments described and illustrated herein.

Turning now to FIG. 5A, a two-magnet deformable sensor 500a is depicted. Within the sensor cavity 501, the north polarity 510 on the bottom of the top magnet 502 creates magnetic repulsion with respect to a corresponding north polarity 510 at the top of the bottom magnet 509. One or more top magnets 502 may be joined to the deformable membrane 503 by any suitable mechanism, such as adhesive(s), fastener(s), magnetic attraction (if there is magnetic material in the deformable membrane 503), and the like. In other embodiments, the south polarity 508 of both magnets may be used for magnetic repulsion. The distance 504 between a top magnet 502 and a bottom magnet 509 determines how much resistance results in response to a downward force 506 being applied to the top magnet 502. In this way, there is an inverse relationship between the distance 504 between the magnets and the amount of displacement 507 (i.e., the distance that the top magnet 502 is lowered, such as force exerted between the deformable sensor and an external object). Thus, the distance 504 can act as the additional spring $C_{add}$ as discussed in FIG. 3. However, to make this a variable spring, the distance 504 itself can be modified in real-time by utilizing a base member 512 located between the housing 505 (e.g., the floor of the sensor cavity 501 in this embodiment) and the bottom magnet 509, by way of non-limiting example. The base member 512 may raise/lower the bottom magnet 509 to modify the distance 504 between the top magnet 502 and the bottom magnet 509. The base member 512 may utilize any suitable mechanism for raising/lowering, such as by way of non-limiting examples a worm gear, trapeze gear, belts, chains, cylinders, trapezoidal spindle, a hydraulic/pneumatic cylinder, and the like. In other embodiments, the base member 512 may move the bottom magnet 509 in any suitable manner, such as any diagonal direction, or horizontally, to change its position within respect to the top magnet 502. In some embodiments, more than one base member 512, bottom magnet 509, and/or top magnet 502 (such as being distributed across the deformable membrane 503) may be utilized within a deformable sensor 500a.

Figure 5B:
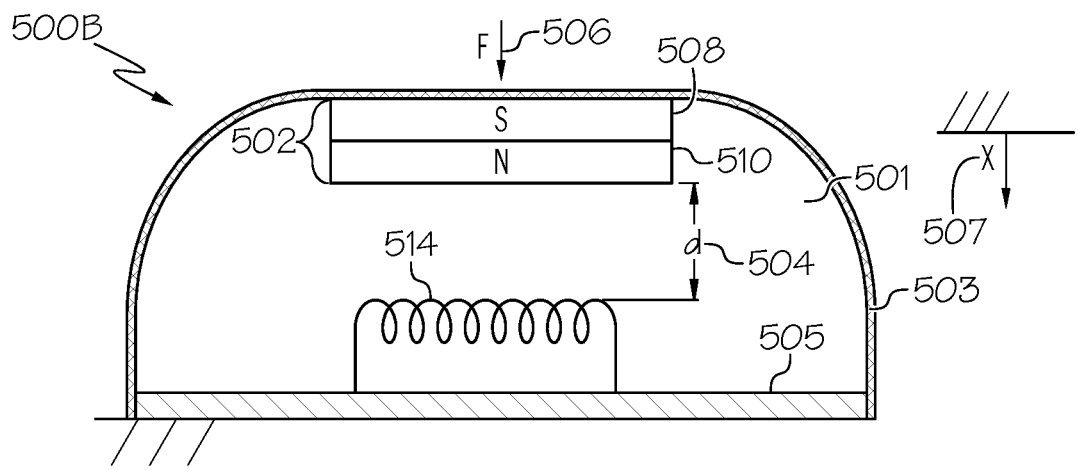
FIG. 5B schematically depicts a deformable sensor with magnetic repulsion force displacement between a magnet and an electrified coil according to one or more embodiments described and illustrated herein.

Turning now to FIG. 5B, an electrified coil deformable sensor 500b is depicted in another embodiment. Within the sensor cavity 501, an electrified coil 514 may be used to generate a magnetic field for repulsion of the top magnet 502. For example, running an electric current in one direction through the electrified coil 514 may generate a north polarity 510 to repel a north polarity 510 at the bottom of the top magnet 502. In another example, running the electric current in the opposite direction through the electrified coil 514 may generate a south polarity 508 which would act to repel a south polarity 508 at the bottom of the top magnet 502. Electricity for the electrified coil 514 may be delivered from any suitable power source, such as from the deformable sensor and/or a robot utilizing the deformable sensor. The strength of the magnetic field generated by the electrified coil 514 may be proportional to the strength of the current running through it (i.e., a stronger current produces a stronger magnetic field). Thus, real-time modification of the electric current can produce a real-time modification to the magnetic repulsion between the electrified coil 514 and the bottom of the top magnet 502. The amount of magnetic repulsion may be further influenced between the distance 504 between the top magnet 502 and the electrified coil 514, such that decreasing the distance 504 increases the magnetic repulsion, and vice-versa. In this way, a stronger current can produce stronger magnetic repulsion, and thus require greater force 506 to be exerted upon the top magnet 502 in order to increase the displacement of the top magnet 502 (and deformable membrane 503) as well as to decrease the distance 504 between the top magnet 502 and the electrified coil 514. Conversely, decreasing the electric current to the electrified coil 514 may reduce the strength of the electric field, thus allowing greater displacement of the top magnet 502 (and deformable membrane 503) using the same amount of force 506. In some embodiments, more than one electrified coil 514 may be utilized within a deformable sensor 500b.

The stiffness (i.e., amount of force-displacement) exhibited by the deformable sensor (due to the height of the base member 512 in FIG. 5A or the strength of the electric current provided to the electrified coil 514 in FIG. 5B) may in turn be used as data for open-loop and/or closed-loop systems for modifying deformable sensor stiffness. In some embodiments, the deformable sensor 100 and/or an internal sensor (such as the floor sensor 105 depicted in FIG. 1A) may receive/send various data, such as through wireless data transmission (wi-fi, Bluetooth, etc.), or any other suitable data communication protocol. For example, the vertical position of the bottom magnet 509 within the deformable sensor due to the base member 512 may be specified by a height parameter and may affect the deformability of the deformable sensor 100. Similarly, the amount of electric current provided to the electrified coil 514 within the deformable sensor may be specified by an electric current parameter and may also affect the deformability of the deformable sensor 100. In some embodiments, receipt of an updated parameter value may result in a real-time (or delayed in other embodiments) update to the stiffness of the deformable sensor (due to the modifying the length of the base member 512 or the strength of the electric current provided to the electrified coil 514, for example). In an open-loop system, the base member 512 or electrified coil 514 may receive input from outside the deformable sensor (such as from a user and/or a robot), wherein the input is configured to control movement (vertical, diagonal, horizontal, etc.) of the bottom magnet 509 (via the base member 512, for example) or the amount of electric current provided to the electrified coil 514.

In a closed-loop system, a floor sensor may, for example, utilize a camera or other optical visual sensor may be located externally from the base member 512 (such as being part of the floor sensor) to observe/measure deformation of the membrane, length of the base member 512, and/or vertical position of the bottom magnet 509 (i.e., distance between the top magnet 502 and the bottom magnet 509). In other embodiments, a sensor within the base member 512 may provide data regarding its lengthening/shortening with respect to the vertical placement of the bottom magnet 509, which may be utilized to control raising/lowering of the bottom magnet 509 based upon the deformation of the deformable membrane 503 and the distance between the top magnet 502 and the bottom magnet 509. In some embodiments, a positional or other sensor located on/in the bottom magnet 509 may be utilized to track its movement and/or the location. With regards to embodiments utilizing an electrified coil 514, a parameter may utilize data pertaining to the amount of electrical current being provided to the electrified coil 514, which may be used to increase/decrease the electric current intensity of the electrified coil 514 based upon the deformation of the deformable membrane 503.

Figure 6:
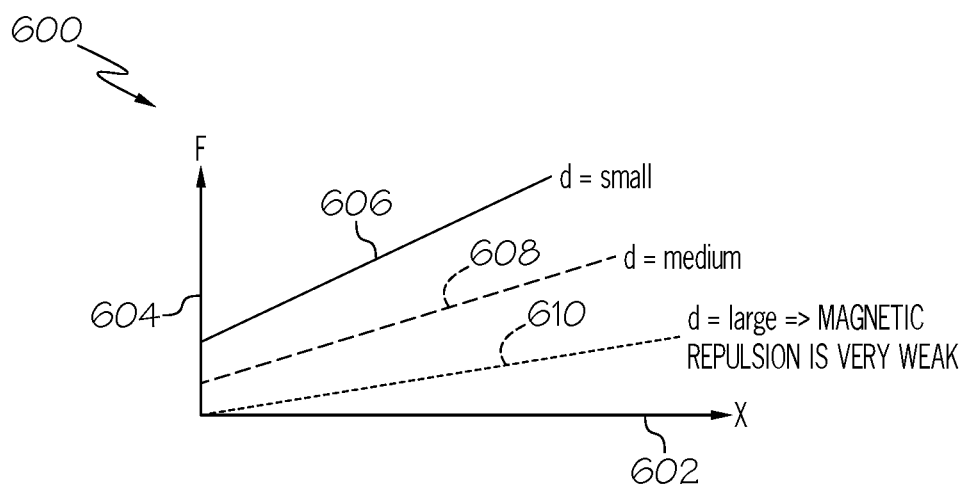
FIG. 6 schematically depicts a magnetic repulsion force-displacement graph corresponding to the exemplary deformable sensors utilizing magnetic repulsion in FIGS. 5A and 5B according to one or more embodiments described and illustrated herein.

Turning now to FIG. 6, a magnetic repulsion force-displacement graph 600 depicts force 604 applied to the top magnet with respect to displacement 602. A small-distance force-displacement plot 606 demonstrates that when the distance (between the top magnet and either a bottom magnet 509 depicted in FIG. 5A or an electrified coil 514 depicted in FIG. 5B, by way of non-limiting examples) is smaller, a greater amount of force is needed to increase displacement. In other words, a greater repulsive force (due to a smaller distance "d") may translate into more force 604 needing to be exerted upon the top magnet to move it downward (i.e., displacement 602) and thereby decrease the distance. A medium distance force-displacement plot 608 correspondingly shows a decreased amount of force 604 needed to obtain the same amount of top magnet displacement, due to the larger distance between the top magnet and the bottom magnet (or electrified coil). Similarly, a large distance force-displacement plot 610 shows the least amount of force 604 needed for the same amount of top magnet displacement, due to the largest distance on the graph 600 between the top magnet and the bottom magnet (or electrified coil).

Figure 7:
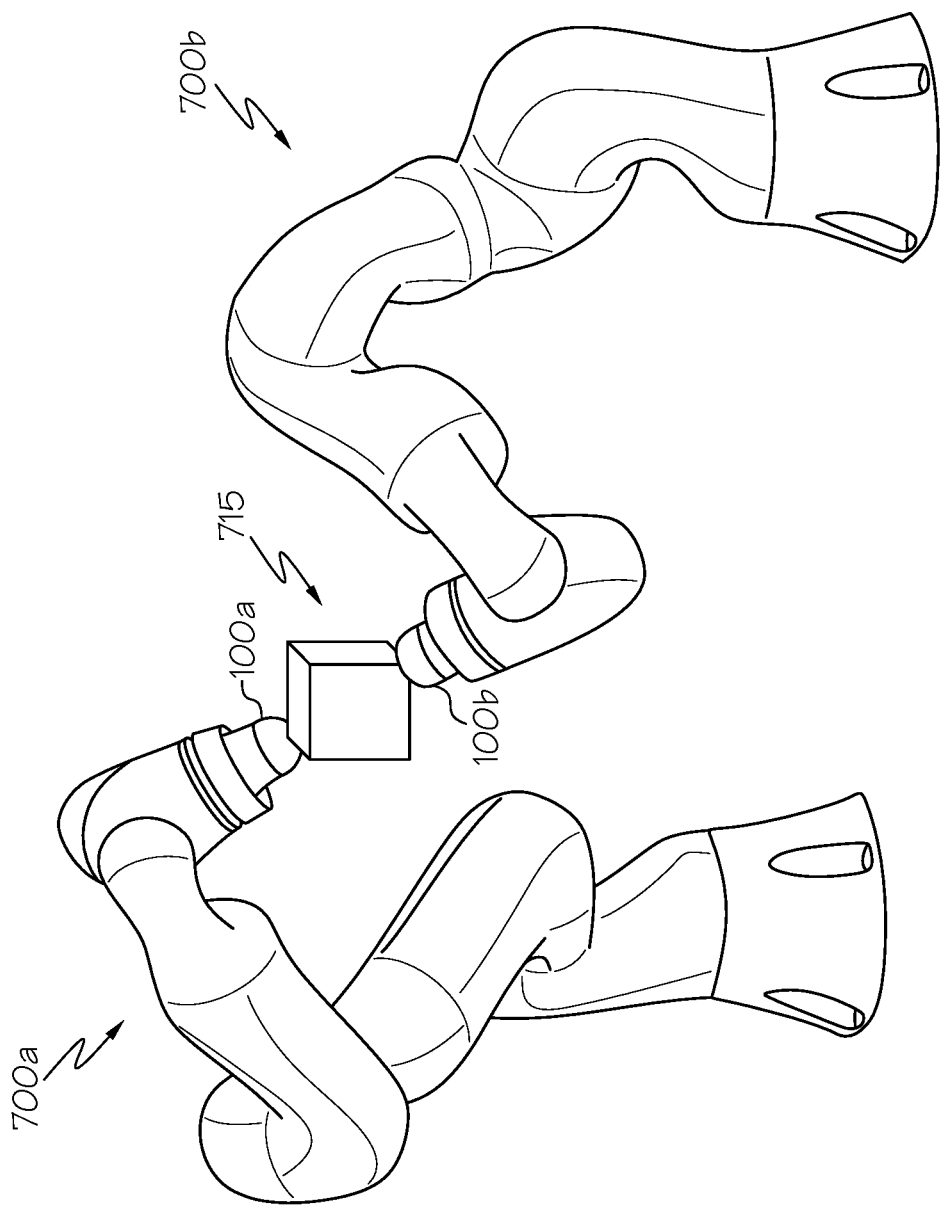
FIG. 7 schematically depicts two example robots each having a deformable sensor and manipulating an object according to one or more embodiments described and illustrated herein.

FIG. 7 schematically depicts an exemplary non-limiting first robot 700a having a first deformable sensor 100a and an exemplary second robot 700*b* having a second deformable sensor 100*b*. In this illustrated example, the first robot 700A and the second robot 700B may cooperate for dual arm manipulation wherein both the first deformable sensor 100*a* and the second deformable sensor 100*b* contact the object 715. As stated above, the deformable sensors 100 (depicted here as 100*a* and 100*b*) described herein may be used as an end effector of a robot to manipulate an object. The deformable sensor 100 may allow a robot to handle an object 715 that is fragile due to the flexible nature of the deformable membrane. Further, the deformable sensor 100 may be useful for robot-to-human contact because in some embodiments the deformable membrane may be softer and/or more flexible/deformable, rather than rigid (non-deformable or nearly so) to the touch.

In addition to geometry and pose estimation, the deformable sensor 100 may be used to determine how much force a robot 700*a* (or other device) is exerting on the target object 715. Although reference is made to first robot 700*a*, any such references may in some embodiments utilize second robot 700*b*, any other suitable devices, and/or any combinations thereof. This information may be used by the robot 700*a* to more accurately grasp objects 715. For example, the displacement of the deformable membrane may be modeled. The model of the displacement of the deformable membrane may be used to determine how much force is being applied to the target object 715. The determined force as measured by the displacement of the deformable membrane may then be used to control a robot 700*a* to more accurately grasp objects 715. As an example, the amount of force a robot 700*a* (discussed in more detail below) applies to a fragile object 715 may be of importance so that the robot 700*a* does not break the object 715 that is fragile. In some embodiments an object 715 may be assigned a softness value (or fragility value), where the robot 700*a* may programmed to interact with all objects 715 based upon the softness value (which may be received at a processor, for example, from a database, server, user input, etc.).

Figure 9:
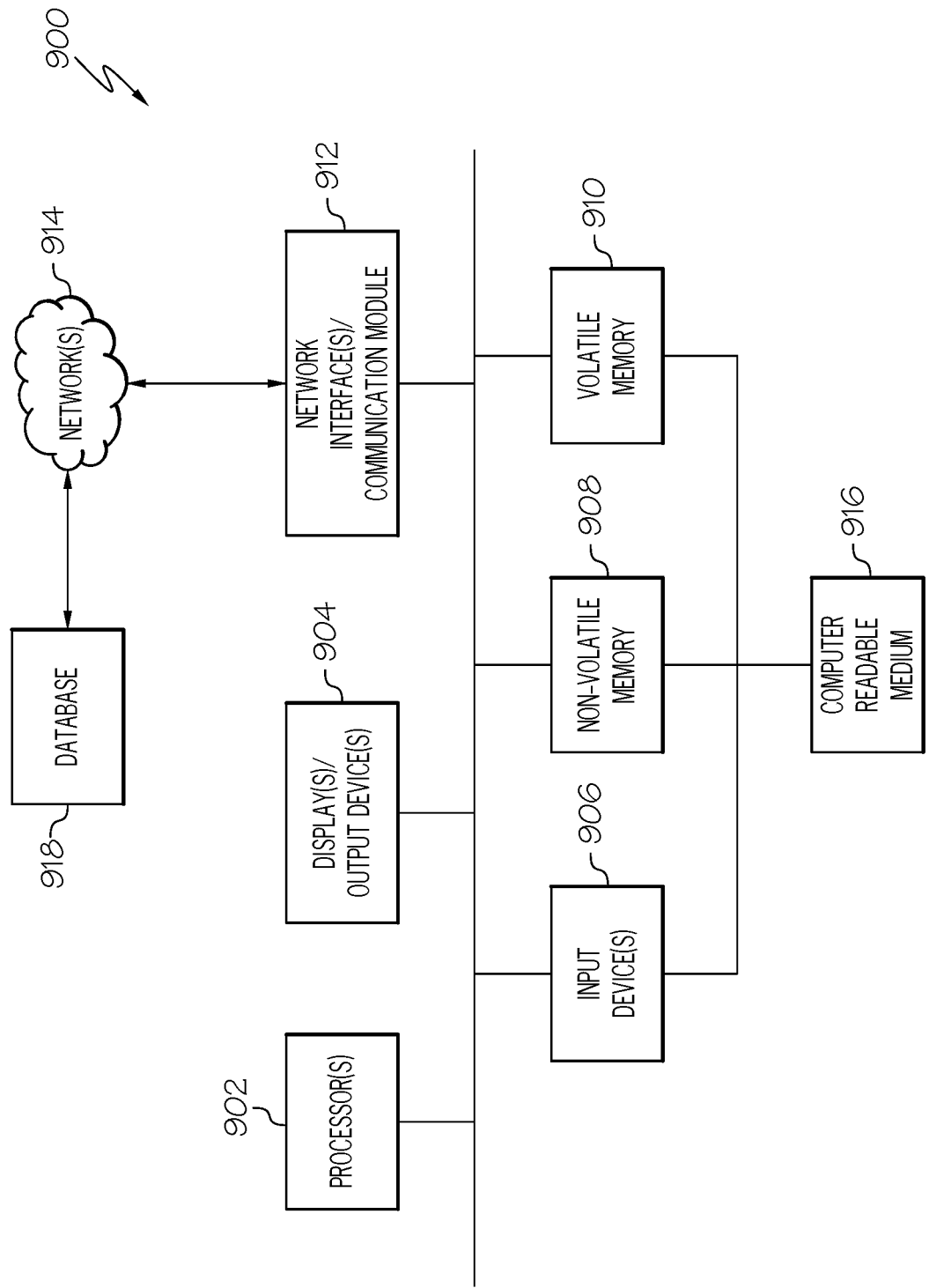
FIG. 9 is a block diagram illustrating computing hardware utilized in one or more devices for implementing various processes and systems, according one or more embodiments described and illustrated herein.
Figure 10:
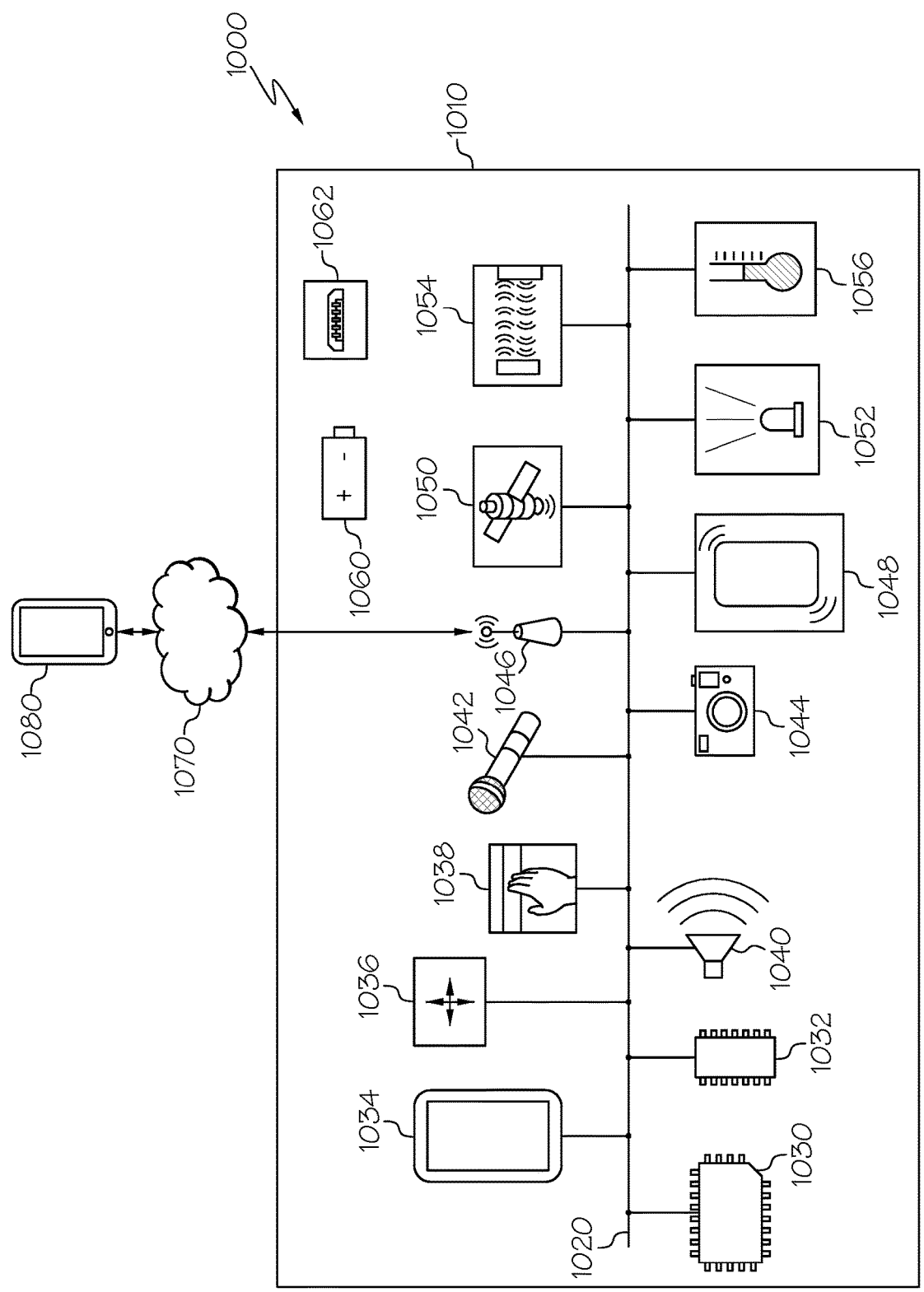
FIG. 10 is a block diagram illustrating hardware utilized in one or more robots and/or deformable sensors for implementing various processes and systems, according one or more embodiments described and illustrated herein.

In some embodiments, an open-loop control system for a deformable sensor 100*a* or a robot 700*a* may include a user interface to specify any suitable value (i.e., stiffness of the deformable sensor 100 based upon modifying electric current provided to the electrified coil, raising/lowering the bottom magnet, air stiffness, membrane stiffness, softness value pertaining to an object 715, etc.) for initialization and/or updating (such as on a display device depicted in 904 FIG. 9, 1034 FIG. 10, etc.). In some closed-loop embodiments, a robot 700*a* and/or floor sensors may be able to identify specific objects 715 (such as via object recognition in a vision system, etc.) whereby the object softness value may be modified, which may lead to automatic modification of the overall stiffness of a deformable sensor (such as raising/lowering a bottom magnet or modifying the amount of electric current provided to an electrified coil) or utilizing a different deformable sensor 100*b* having a more suitable stiffness or range of stiffness values, deformability aggregate spatial resolution, depth resolution, pressure, and/or material for the deformable membrane. In some embodiments, a processor in a deformable sensor 100*a* and/or a robot 700*a* may receive data from the floor sensor representing the contact region. In various embodiments, a processor in a deformable sensor 100*a* and/or a robot 700*a* may determine a vector normal to a surface of the object based on the data representing the contact region and utilize the vector to determine which direction the object is oriented.

Figure 8:
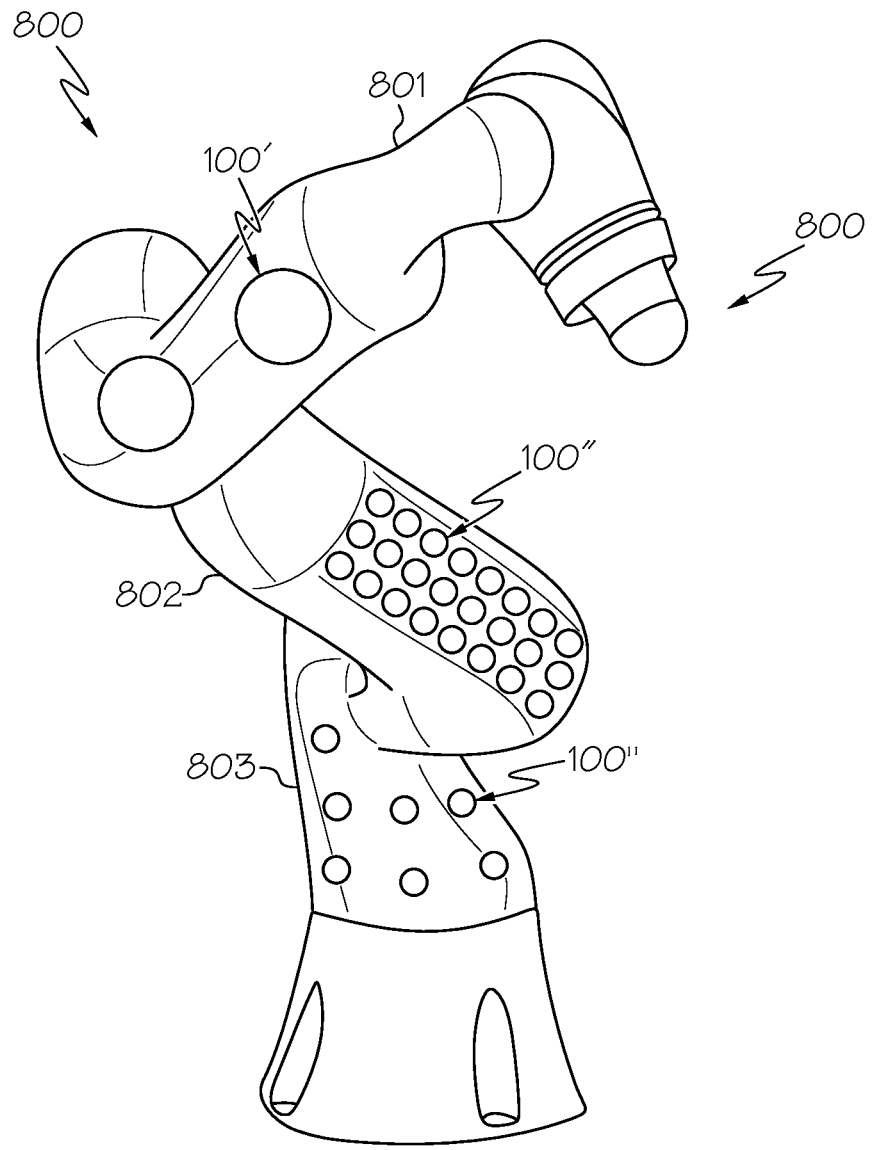
FIG. 8 schematically depicts an example robot having a plurality of deformable sensors with varying spatial resolution and depth resolution according to one or more embodiments described and illustrated herein.

In embodiments, a plurality of deformable sensors may be provided at various locations on a robot 800. FIG. 8 depicts an exemplary robot 800 having a plurality of deformable sensors 100, 100' and 100" at different locations. A deformable sensor 100 may act as an end effector of the robot 800, and have a high spatial resolution and/or depth resolution. In some embodiments, a deformable sensor 100 may have a clamp or other suitable attachment mechanism. For example, the deformable sensor 100 may be removably attached to a robot 800, and/or a robot 800 which may have features to provide for attachment and/or removal of a deformable sensor 100. Any suitable type of clamp, fastener, or attachment mechanism may be utilized in some embodiments.

Each deformable sensor 100 may have a desired spatial resolution and/or a desired depth resolution depending on its location on the robot 800. In the illustrated embodiment, deformable sensors 100' are disposed on a first arm portion 801 and a second arm portion 802 (the terms "arm portion" and "portion" being used interchangeably throughout). An arm portion may have one or more deformable sensors 100, or none at all. The deformable sensors 100' may be shaped to conform to the shape of the first arm portion 801 and/or the second arm portion 802. It may be noted that the deformable sensors 100 described herein may take on any shape depending on the application. Deformable sensors 100' may be very flexible and thus deformable. This may be beneficial in human-robot interactions. In this way, the robot 800 may contact a person (e.g., to give the person a "hug") without causing harm due to the softness of the deformable sensors 100' and/or due to an ability to control the force of the contact with an object. The spatial resolution of one or more deformation sensors 100' in the arm portions 801, 802 may be high or low depending on the application. In the example of FIG. 8, the deformable sensors 100" near the base portion 803 of the robot 800 may have low spatial resolution, and may be configured to only detect contact with a target object. The deformability of deformable sensors 100" near the base of the robot 800 may be set based on the application of the robot 800. For example, the size of the magnets, the potential length of the base member, and/or the amount of available electric current may be factors as to whether particular deformable sensors are better suited to particular applications (such as placement location on a robot 900) in terms of their stiffness and/or size. The depth resolution and/or spatial resolution of the deformable sensors 100 may be varied along different parts of the robot 800. For example, one portion 803 it may not be necessary to identify the shape and/or pose of an object coming into contact with a particular deformable sensor 100, as simply registering contact with an object may provide sufficient information, whereas contact with another portion (such as 801) may produce pose and/or shape information derived from the contact. As shown in FIG. 8, deformable sensors 100 may be of any suitable size, which may vary even within an arm portion. Although arm portions 801, 802, 803 are depicted as being discrete/non-overlapping, overlap may occur in other embodiments.

Turning to FIG. 9, a block diagram illustrates an example of a computing device 900, through which embodiments of the disclosure can be implemented, such as (by way of non-limiting example) a deformable sensor 100, a floor sensor 105, a base member 512, an electrified coil 514, a robot 800, or any other device described herein. The computing device 900 described herein is but one example of a suitable computing device and does not suggest any limitation on the scope of any embodiments presented. Nothing illustrated or described with respect to the computing device 900 should be interpreted as being required or as creating any type of dependency with respect to any element or plurality of elements. In various embodiments, a computing device 900 may include, but need not be limited to, a deformable sensor 100, a floor sensor 105, a base member 512, an electrified coil 514, a robot 800, and the like. In an embodiment, the computing device 900 includes at least one processor 902 and memory (non-volatile memory 908 and/or volatile memory 910). The computing device 900 can include one or more displays and/or output devices 904 such as monitors, speakers, headphones, projectors, wearable-displays, holographic displays, and/or printers, for example. The computing device 900 may further include one or more input devices 906 which can include, by way of example, any type of mouse, keyboard, disk/media drive, memory stick/thumb-drive, memory card, pen, touch-input device, biometric scanner, voice/auditory input device, motion-detector, camera, scale, etc.

The computing device 900 may include non-volatile memory 908 (ROM, flash memory, etc.), volatile memory 910 (RAM, etc.), or a combination thereof. A network interface 912 can facilitate communications over a network 914 with other data source such as a database 918 via wires, via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM. Network interface 912 can be communicatively coupled to any device capable of transmitting and/or receiving data via the network 914. Accordingly, the hardware of the network interface 912 can include a communication transceiver for sending and/or receiving any wired or wireless communication. For example, the network interface hardware may include an antenna, a modem, LAN port, Wi-Fi card, WiMax card, mobile communications hardware, near-field communication hardware, satellite communication hardware and/or any wired or wireless hardware for communicating with other networks and/or devices.

A computer readable storage medium 916 may comprise a plurality of computer readable mediums, each of which may be either a computer readable storage medium or a computer readable signal medium. A computer readable storage medium 916 may reside, for example, within an input device 906, non-volatile memory 908, volatile memory 910, or any combination thereof. A computer readable storage medium can include tangible media that is able to store instructions associated with, or used by, a device or system. A computer readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer readable storage medium may also include, for example, a system or device that is of a magnetic, optical, semiconductor, or electronic type. Computer readable storage media and computer readable signal media are mutually exclusive. For example, a deformable sensor 100, a robot 800, and/or a server may utilize a computer readable storage medium to store data received from one or more floor sensors 105.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The computing device 900, which may be implemented in any/each of a deformable sensor 100, a floor sensor 105, a base member 512, an electrified coil 514, a robot 800, may include one or more network interfaces 912 to facilitate communication with one or more remote devices, which may include, for example, client and/or server devices. In various embodiments the computing device (for example a robot or deformable sensor) may be configured to communicate over a network with a server or other network computing device to transmit and receive data from one or more deformable sensors 100 on a robot 800. A network interface 912 may also be described as a communications module, as these terms may be used interchangeably. The database 918 is depicted as being accessible over a network 914 and may reside within a server, the cloud, or any other configuration to support being able to remotely access data and store data in the database 918.

Turning now to FIG. 10, example components of one non-limiting embodiment of a robot 1000 is schematically depicted, which may include components of a deformable sensor 100. The robot 1000 includes a housing 1010, a communication path 1028, a processor 1030, a memory module 1032, a display 1034, an inertial measurement unit 1036, an input device 1038, an audio output device 1040 (e.g., a speaker), a microphone 1042, a camera 1044, network interface hardware 1046, a tactile feedback device 1048, a location sensor 1050, a light 1052, a proximity sensor 1054, a temperature sensor 1056, a motorized wheel assembly 1058, a battery 1060, and a charging port 1062. The components of the robot 1000 other than the housing 1010 may be contained within or mounted to the housing 1010. The various components of the robot 1000 and the interaction thereof will be described in detail below.

Still referring to FIG. 10, the communication path 1028 may be formed from any medium that is capable of transmitting a signal such as, for example, conductive wires, conductive traces, optical waveguides, or the like. Moreover, the communication path 1028 may be formed from a combination of mediums capable of transmitting signals. In one embodiment, the communication path 1028 comprises a combination of conductive traces, conductive wires, connectors, and buses that cooperate to permit the transmission of electrical data signals to components such as processors, memories, sensors, input devices, output devices, and communication devices. Accordingly, the communication path 1028 may comprise a bus. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 1028 communicatively couples the various components of the robot 1000. As used herein, the term "communicatively coupled" means that coupled components are capable of exchanging data signals with one another such as, for example, electrical signals via conductive medium, electromagnetic signals via air, optical signals via optical waveguides, and the like.

The processor 1030 of the robot 1000 and/or deformable sensor 100 may be any device capable of executing machine-readable instructions. Accordingly, the processor 1030 may be a controller, an integrated circuit, a microchip, a computer, or any other computing device. The processor 1030 may be communicatively coupled to the other components of the robot 1000 and/or deformable sensor 100 by the communication path 1028. This may, in various embodiments, allow the processor 1030 to receive data from the one or more deformable sensors 100 which may be part of the robot 1000. In other embodiments, the processor 1030 may receive data directly from one or more floor sensors 105, which are part of one or more deformable sensors 100 on a robot 1000. Accordingly, the communication path 1028 may communicatively couple any number of processors with one another, and allow the components coupled to the communication path 1028 to operate in a distributed computing environment. Specifically, each of the components may operate as a node that may send and/or receive data. While the embodiment depicted in FIG. 10 includes a single processor 1030, other embodiments may include more than one processor.

Still referring to FIG. 10, the memory module 1032 of the robot 1000 and/or a deformable sensor 100 is coupled to the communication path 1028 and communicatively coupled to the processor 1030. The memory module 1032 may, for example, contain instructions for modifying the length of a base member or the amount of electric current provided to an electrified coil. In this example, these instructions stored in the memory module 1032, when executed by the processor 1030, may allow for the determination of the stiffness of the deformable sensor 100 based on the observed deformation of the deformable membrane 102 in view of the length of the base member 512 (and corresponding position of the bottom magnet 509), the amount of electric current provided to an electrified coil 514, the air stiffness value within the sensor cavity 501, and/or stiffness of the deformable membrane 102. The memory module 1032 may comprise RAM, ROM, flash memories, hard drives, or any non-transitory memory device capable of storing machine-readable instructions such that the machine-readable instructions can be accessed and executed by the processor 1030. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 1032. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 10 includes a single memory module 1032, other embodiments may include more than one memory module.

The display 1034, if provided, is coupled to the communication path 1028 and communicatively coupled to the processor 1030. The display 1034 may be any device capable of providing tactile output in the form of refreshable messages, such as such as monitors, speakers, headphones, projectors, wearable-displays, holographic displays, and/or printers, for example. A message conveys information to a user via visual and/or audio information. The display 1034 may provide information to the user regarding the operational state of the deformable sensor 100 and/or robot 800.

Any known or yet-to-be-developed tactile display may be used. In some embodiments, the display 1034 is a three dimensional tactile display including a surface, portions of which may raise to communicate information. The raised portions may be actuated mechanically in some embodiments (e.g., mechanically raised and lowered pins). The display 1034 may also be fluidly actuated, or it may be configured as an electrovibration tactile display.

The inertial measurement unit 1036, if provided, is coupled to the communication path 1028 and communicatively coupled to the processor 1030 and may be located, for example, in the base member 512 or bottom magnet 509. The inertial measurement unit 1036 may include one or more accelerometers and one or more gyroscopes. The inertial measurement unit 1036 transforms sensed physical movement of the base member 512 and/or bottom magnet 509 into one or more of a signal indicative of an orientation, a velocity, or an acceleration. Some embodiments of the base member 512 and/or bottom magnet 509 may not include the inertial measurement unit 1036, such as embodiments that include an accelerometer but not a gyroscope, embodiments that include a gyroscope but not an accelerometer, or embodiments that include neither an accelerometer nor a gyroscope.

Still referring to FIG. 10, one or more input devices 1038 are coupled to the communication path 1028 and communicatively coupled to the processor 1030. The input device 1038 may be any device capable of transforming user contact into a data signal that can be transmitted over the communication path 1028 such as, for example, a button, a switch, a knob, a microphone or the like. In various embodiments an input device 1038 may be a deformable sensor 100 and/or an internal sensor as described above. In some embodiments, the input device 1038 includes a power button, a volume button, an activation button, a scroll button, or the like. The one or more input devices 1038 may be provided so that the user may interact with the deformable sensor 100, such as in an open-loop control system to navigate menus, make selections, set preferences, and other functionality described herein. In some embodiments, the input device 1038 includes a pressure sensor, a touch-sensitive region, a pressure strip, or the like. It should be understood that some embodiments may not include the input device 1038.

The speaker 1040 (i.e., an audio output device) is coupled to the communication path 1028 and communicatively coupled to the processor 1030. The speaker 1040 transforms audio message data from the processor 1030. However, it should be understood that, in other embodiments, the robot 1000 may not include the speaker 1040.

The microphone 1042 is coupled to the communication path 1028 and communicatively coupled to the processor 1030. The microphone 1042 may be any device capable of transforming a mechanical vibration associated with sound into an electrical signal indicative of the sound. The microphone 1042 may be used as an input device 1038 to perform tasks, such as navigate menus, input settings and parameters, and any other tasks. It should be understood that some embodiments may not include the microphone 1042.

Still referring to FIG. 10, the camera 1044 is coupled to the communication path 1028 and communicatively coupled to the processor 1030. In one embodiment, the floor sensor 105 may incorporate one or more cameras to view, for example, movement of the base member 512 and/or bottom magnet 509. The camera 1044 may be any device having an array of sensing devices (e.g., pixels) capable of detecting radiation in an ultraviolet wavelength band, a visible light wavelength band, or an infrared wavelength band. The camera 1044 may have any resolution. The camera 1044 may be an omni-directional camera, or a panoramic camera. In some embodiments, one or more optical components, such as a mirror, fish-eye lens, or any other type of lens may be optically coupled to the camera 1044.

The network interface hardware 1046 is coupled to the communication path 1028 and communicatively coupled to the processor 1030. The network interface hardware 1046 may be any device capable of transmitting and/or receiving data via a network 1070. Accordingly, network interface hardware 1046 can include a wireless communication module configured as a communication transceiver for sending and/or receiving any wired or wireless communication. For example, the network interface hardware 1046 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, network interface hardware 1046 includes hardware configured to operate in accordance with the Bluetooth wireless communication protocol. In another embodiment, network interface hardware 1046 may include a Bluetooth send/receive module for sending and receiving Bluetooth communications to/from a portable electronic device 1080. The network interface hardware 1046 may also include a radio frequency identification ("RFID") reader configured to interrogate and read RFID tags.

In some embodiments, the robot 1000 and/or deformable sensor 100 may be communicatively coupled to a portable electronic device 1080 via the network 1070. In some embodiments, the network 1070 is a personal area network that utilizes Bluetooth technology to communicatively couple the robot 1000 and/or deformable sensor 100 with the portable electronic device 1080. In other embodiments, the network 1070 may include one or more computer networks (e.g., a personal area network, a local area network, or a wide area network), cellular networks, satellite networks and/or a global positioning system and combinations thereof. Accordingly, the robot 1000 and/or deformable sensor 100 can be communicatively coupled to the network 1070 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Still referring to FIG. 10, as stated above, the network 1070 may be utilized to communicatively couple the robot 1000 and/or deformable sensor 100 with the portable electronic device 1080. The portable electronic device 1080 may include a mobile phone, a smartphone, a personal digital assistant, a camera, a dedicated mobile media player, a mobile personal computer, a laptop computer, and/or any other portable electronic device capable of being communicatively coupled with the robot 1000 and/or deformable sensor 100. The portable electronic device 1080 may include one or more processors and one or more memories. The one or more processors can execute logic to communicate with the robot 1000 and/or deformable sensor 100. The portable electronic device 1080 may be configured with wired and/or wireless communication functionality for communicating with the robot 1000 and/or deformable sensor 100. In some embodiments, the portable electronic device 1080 may perform one or more elements of the functionality described herein, such as in embodiments in which the functionality described herein is distributed between the robot 1000 and/or deformable sensor 100, and the portable electronic device 1080.

The tactile feedback device 1048 is coupled to the communication path 1028 and communicatively coupled to the processor 1030. The tactile feedback device 1048 may be any device capable of providing tactile feedback to a user. The tactile feedback device 1048 may include a vibration device (such as in embodiments in which tactile feedback is delivered through vibration), an air blowing device (such as in embodiments in which tactile feedback is delivered through a puff of air), or a pressure generating device (such as in embodiments in which the tactile feedback is delivered through generated pressure). It should be understood that some embodiments may not include the tactile feedback device 1048.

The location sensor 1050 is coupled to the communication path 1028 and communicatively coupled to the processor 1030. The location sensor 1050 may be any device capable of generating an output indicative of a location. In some embodiments, the location sensor 1050 includes a global positioning system (GPS) sensor, though embodiments are not limited thereto. Some embodiments may not include the location sensor 1050. The location sensor 1050 may also be configured as a wireless signal sensor capable of triangulating a location of the robot 1000 and/or the deformable sensor 100 by way of wireless signals received from one or more wireless signal antennas.

The motorized wheel assembly 1058 is coupled to the communication path 1028 and communicatively coupled to the processor 1030, and may correspond to the base member 512. The motorized wheel assembly 1058 may include motorized wheels (not shown) that are driven by one or more motors (not shown). The processor 1030 may provide one or more drive signals to the motorized wheel assembly 1058 to actuate the motorized wheels such that the base member 512 moves vertically and/or horizontally, tilts, etc.

Still referring to FIG. 10, the light 1052 is coupled to the communication path 1028 and communicatively coupled to the processor 1030. The light 1052 may be any device capable of outputting light, such as, but not limited to, a light emitting diode, an incandescent light, a fluorescent light, or the like. Some embodiments include a power indicator light that is illuminated when the robot 1000 and/or deformable sensor 100 is powered on. Some embodiments include an activity indicator light that is illuminated when the robot 1000 and/or deformable sensor 100 is active or processing data. Some embodiments include an illumination light for illuminating the environment in which the robot 1000 and/or deformable sensor 100 is located. Some embodiments may not include the light 1052.

The proximity sensor 1054 is coupled to the communication path 1028 and communicatively coupled to the processor 1030. The proximity sensor 1054 may be any device capable of outputting a proximity signal indicative of a proximity of the robot 1000 and/or deformable sensor 100 to another object. In some embodiments, the proximity sensor 1054 may include a laser scanner, a capacitive displacement sensor, a Doppler effect sensor, an eddy-current sensor, an ultrasonic sensor, a magnetic sensor, an internal sensor, a radar sensor, a lidar sensor, a sonar sensor, or the like. Some embodiments may not include the proximity sensor 1054.

The temperature sensor 1056 is coupled to the communication path 1028 and communicatively coupled to the processor 1030. The temperature sensor 1056 may be any device capable of outputting a temperature signal indicative of a temperature sensed by the temperature sensor 1056. In some embodiments, the temperature sensor 1056 may include a thermocouple, a resistive temperature device, an infrared sensor, a bimetallic device, a change of state sensor, a thermometer, a silicon diode sensor, or the like. Some embodiments may not include the temperature sensor 1056.

Still referring to FIG. 10, the robot 1000 is powered by the battery 1060, which is electrically coupled to the various electrical components of the robot 1000. The battery 1060 may be any device capable of storing electric energy for later use by the robot 1000 and/or deformable sensor 100. In some embodiments, the battery 1060 is a rechargeable battery, such as a lithium-ion battery or a nickel-cadmium battery. In embodiments in which the battery 1060 is a rechargeable battery, the robot 1000 may include the charging port 1062, which may be used to charge the battery 1060. In some embodiments, a deformable sensor 100 may be powered by the robot 1000 without utilizing a battery 1060. In some embodiments, the electrified coil 514 receives electrical current from the battery 1060, along with or instead of receiving power from a robot 1000 and/or deformable sensor 100. Some embodiments may not include the battery 1060, such as embodiments in which the robot 1000 is powered the electrical grid, by solar energy, or by energy harvested from the environment. Some embodiments may not include the charging port 1062, such as embodiments in which the apparatus utilizes disposable batteries for power.

It should now be understood that embodiments of the present disclosure are directed to deformable sensors capable of modifying their stiffness based upon different factors such as stiffness of air inside the deformable sensor, the stiffness of the deformable membrane, and/or a variable stiffness provided by repulsion between magnets or between a magnet and an electrified coil. A base member may be utilized to adjust the height of a bottom magnet to thereby modify the distance between magnets. Modifying the distance between the magnets in turn may inversely modify the amount of magnetic repulsion between the magnets. Another way to modify repulsion within a deformable sensor may be to modify the strength of the electric current utilized by the electrified coil to repel a magnet. By modifying the amount of magnetic repulsion experienced by an upper magnet (located at the deformable membrane), the amount of force required to achieve displacement upon the deformable sensor can be correspondingly modified, thereby affecting the stiffness of the deformable sensor as a whole.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A deformable sensor comprising:
   a membrane coupled to a housing to form a sensor cavity;
   a first magnet located on an inner surface of the membrane in the sensor cavity;
   a second magnet, located at a base within the sensor cavity, configured to modifiably repel the first magnet and modify stiffness of the deformable sensor and
   a base member located between the base of the sensor cavity and the second magnet.

2. The deformable sensor of claim 1, wherein the base member is configured to elongate or contract to modify proximity of the second magnet to the first magnet.

3. The deformable sensor of claim 2, further comprising a positional sensor configured to measure a position of the second magnet relative to the first magnet.

4. The deformable sensor of claim 2, wherein the base member is configured to receive input from outside the deformable sensor to control positioning of the second magnet relative to the first magnet.

5. The deformable sensor of claim 2, further comprising a floor sensor configured to:
   observe deformation of the membrane;
   observe distance between the first magnet and the second magnet; and
   control raising or lowering of the second magnet based upon the deformation of the membrane and the distance between the first magnet and the second magnet.

6. The deformable sensor of claim 1, further comprising a plurality of first magnets located on the inner surface of the membrane.

7. A method of magnetically modifying stiffness of a deformable sensor comprising:
   modifying, within a sensor cavity formed by a membrane coupled to a housing, repulsion between:
   a first magnet located on an inner surface of the membrane in the sensor cavity; and
   an electrified coil having a magnetic field with a polarity that repels the first magnet, located at a base within the sensor cavity; and modifying stiffness of the deformable sensor based upon the modified repulsion.

8. The method of claim 7, further comprising:
modifying intensity of an electric current that generates the magnetic field of the electrified coil; and
modifying repulsion intensity based upon modification of the electric current.

9. The method of claim 8, further comprising:
receiving input from outside the deformable sensor to modify the electric current intensity of the electrified coil; and
modifying the repulsion based upon the received input.

10. The deformable sensor of claim 7, wherein the deformable sensor further comprises a plurality of first magnets located on the inner surface of the membrane.

11. A deformable sensor comprising:
a membrane coupled to a housing to form a sensor cavity;
a first magnet located on an inner surface of the membrane in the sensor cavity; and
a magnetic object, located at a base within the sensor cavity, configured to modifiably repel the first magnet and modify stiffness of the deformable sensor, wherein the magnetic object is an electrified coil having a magnetic field with a polarity configured to repel the first magnet.

12. The deformable sensor of claim 11, wherein the electrified coil is configured to modify intensity of the repulsion based upon modification of intensity of an electric current that generates the magnetic field of the electrified coil.

13. The deformable sensor of claim 12, wherein the electrified coil is further configured to receive input from outside the deformable sensor to modify the intensity of the electric current of the electrified coil to modify the repulsion.

14. The deformable sensor of claim 11, further comprising a plurality of first magnets located on the inner surface of the membrane.

* * * * *

UNITED STATES PATENT AND TRADEMARK OFFICE
CERTIFICATE OF CORRECTION

| | | |
|---|---|---|
| PATENT NO. | : 11,920,992 B2 | Page 1 of 1 |
| APPLICATION NO. | : 17/380237 | |
| DATED | : March 5, 2024 | |
| INVENTOR(S) | : Manuel L. Kuehner and Naveen Suresh Kuppuswamy | |

It is certified that error appears in the above-identified patent and that said Letters Patent is hereby corrected as shown below:

In the Specification

In Column 3, Line(s) 61, after "mounted", insert --on--.

Signed and Sealed this
Thirtieth Day of April, 2024

*Katherine Kelly Vidal*

Katherine Kelly Vidal
*Director of the United States Patent and Trademark Office*